United States Patent Office 3,366,598
Patented Jan. 30, 1968

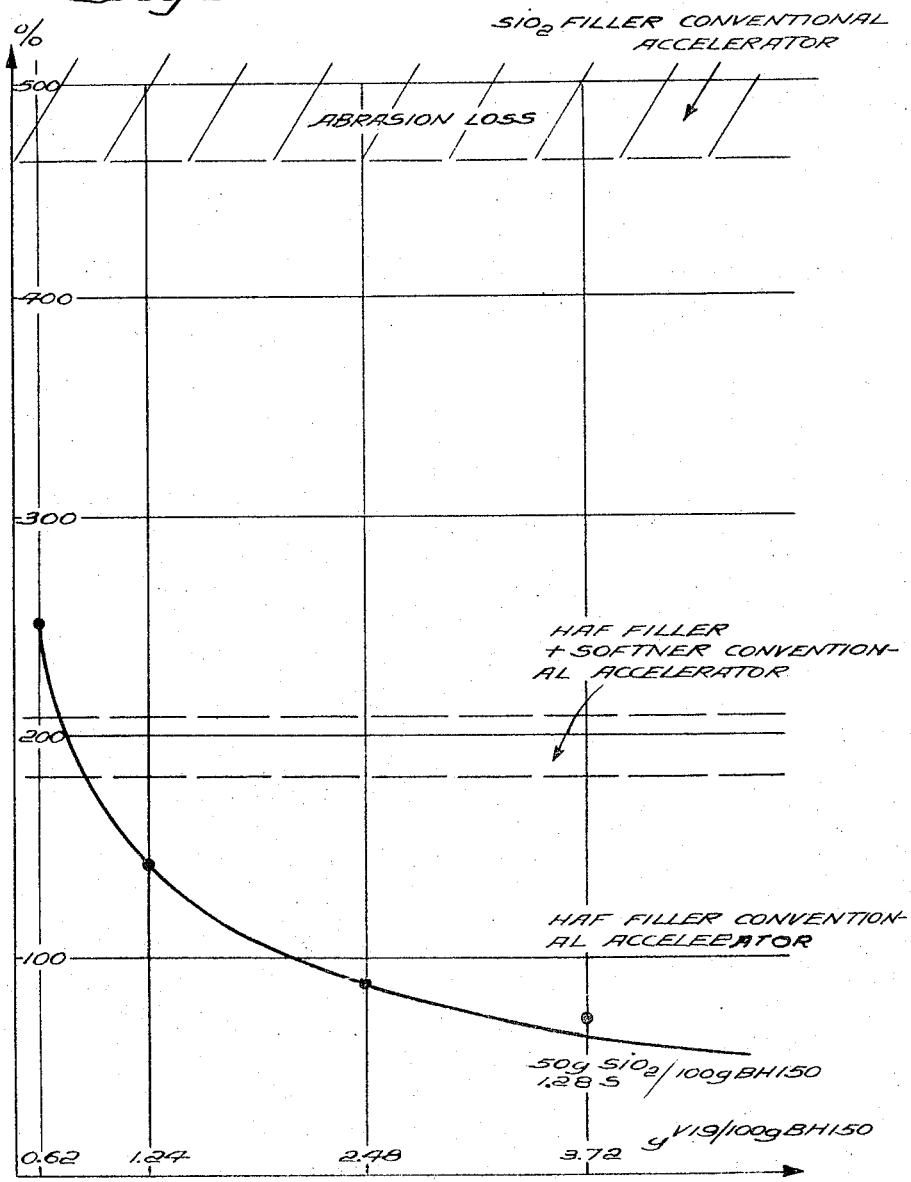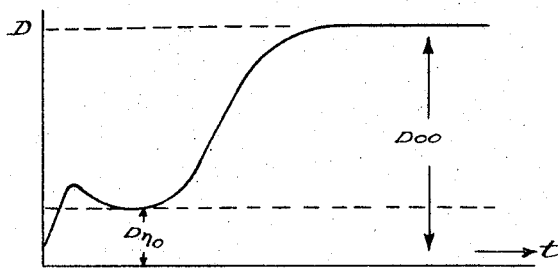

3,366,598
PROCESS FOR THE VULCANIZATION OF RUBBER AND DOUBLE BOND CONTAINING RUBBER-LIKE ELASTOMER COMPOSITIONS CONTAINING FILLERS
Hermann Westlinning, Kleinostheim, Siegfried Wolff, Bruhl, Bezirk Cologne, and Werner Schwarze, Frankfurt am Main, Germany, assignors to Deutsche Gold- und Silber-Scheideanstalt vormals Roessler, Frankfurt am Main, Germany
Filed Dec. 23, 1965, Ser. No. 516,025
Claims priority, application Germany, Dec. 24, 1964, D 46,134
7 Claims. (Cl. 260—41.5)

The present invention relates to a process for the vulcanization of rubber or double bond containing rubber-like elastomer compositions containing fillers, such as, carbon black, silica and silicates.

In order to obtain the optimum properties in vulcanizates of rubber compositions containing reenforcing fillers vulcanization systems are usually employed which are built up of a large number of components. In addition to the elastomer and the more or less active reenforcing filler they contain one or more vulcanization accelerators, usch as, for example, 2,2'-dibenzothiazyl disulfide, 2-mercaptobenzothiazole, diphenyl guanidine and others, sulfur, zinc oxide, stearic acid, antioxidants and, if desired, softeners. The complicated systems indicated above all have proved good for the vulcanization of carbon black containing rubber compositions. They, however, more or less fail when the so-called light fillers, such as, especially active reenforcing silicas, are employed and vulcanizates are desired which are primarily subjected to dynamic stresses rather than static stresses. In view of the consideration that the active light fillers more or less strongly absorb the accelerators and they are withdrawn thereby from their primary function in the vulcanization procedure, it has been customary to increase the quantities of the accelerators employed some 50 to 500% over the quantities normally employed in carbon black filled compositions. Aside from the fact that this increased requirement for accelerators, which in part are costly substances, is an economic disadvantage, the properties of the vulcanizates obtained still do not meet the requirements which are made today for carbon black filled vulcanizates, for example, in abrasion loss values or the moduli.

Very extensive investigations of the non-accelerated and accelerated vulcanization of non-filled and carbon black filled mixtures have confirmed the necessity of additions of zinc oxide and stearic acid in order to increase the yield of cross-linking bridges and the velocity of the vulcanization, but other tests have also shown that the course of the vulcanization procedure with mixtures filled with light reenforcing fillers does not undergo any essential change whether in the presence or absence of zinc oxide and stearic acid. The absence of the zinc sulfide sulfur, the presence of which is characteristic for an undisturbed vulcanization reaction, the presence of which can always be detected when zinc oxide and stearic acid take part in cross-linking reaction which is the basis for the vulcanization, permits the conclusion that, when finely divided silica or equivalent fillers are used, the partial reaction between the zinc oxide or respectively stearate and the active group of the accelerator, for instance, a benzothiazyl radical, which is essential for the conventional vulcanization of nonfilled or carbon black filled mixtures, does not occur. The result of this is that in the presence of light fillers, cross-linking primarily occurs by the formation of thioether-like or disulfide bridging bonds.

As evidently the surface characteristics of the filler, particularly the number of reactive hydroxyl or silanol groups present, plays a role in disturbing the vulcanization reaction when finely divided silicia is used, attempts have been made to provide vulcanization conditions by modification of the filler surface characteristics which during the course of the vulcanization reaction and in the properties of the vulcanization obtained correspond to those of the conventional vulcanization of carbon black filled mixtures. It was found, however, that the improvements attained by such surface modification in no way lead to light vulcanizates with the properties of the carbon black vulcanizates, especially with regard to the properties concerned under dynamic stresses. The increased vulcanizing agent requirements which occur in many instances even with surface modified silicas, permits the conclusion that the surface modification does not ensure that disturbances during vulcanization do not occur. Furthermore, when it has been possible to normalize the character of the vulcanization by modification of the surface characteristics of the light filler, this also has led to a very considerable decrease in the original reenforcing properties of the filler.

According to the invention it was unexpectedly found that a vulcanization reaction could be achieved which overcomes the difficulties encountered in vulcanizations with conventional accelerators, especially in the presence of light reenforcing fillers even without modification of their surface characteristics when certain derivatives of 1,3,5-triazine are employed instead of the conventional accelerators.

According to the invention the vulcanization of reenforcing filler containing compositions of rubber or rubber like elastomers which still contain double bonds is carried out with the aid of a vulcanization system which in addition to sulfur contains a 1,3,5-triazine of the following general formula

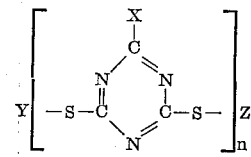

in which n signifies an integer of from 1 to 20, preferably 1–10. X signifies: hydrogen, alkyl, alkenyl, aryl, or aralkyl groups which can be attached directly to the ring or over heteroatoms or heteroatom groups such as, for example,—O—, —S—, —NH—, —NHSO$_2$— and —NH—NH— and which also may be substituted.

Each of Y and Z taken individually signifies:

(a)     hydrogen (b)     —S—R wherein R signifies alkyl, alkenyl, aryl, aralkyl or heterocyclic ring systems (c)

wherein each of R$^1$ and R$^2$ taken individually signifies hydrogen, alkyl, alkenyl, aryl or aralkyl (d)
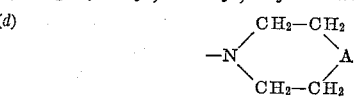

wherein A signifies —O—, —S—, —CH$_2$— or —NH—, in which H can be substituted.

Suitable substituents for the alkyl, alkenyl, aryl and aralkyl radicals, for instance, are —OH, —SH, —NH$_2$, —CN, —COOH and sulfonic acid groups.

The new vulcanization system according to the invention can be used to vulcanize reenforcing filler containing compositions of natural and synthetic rubber as well as double bond containing rubber like elastomers.

The properties of the vulcanizates produced with the vulcanization system of the invention can in every respect be compared with those obtained with conventional vulcanization systems or surpass them. The new vulcanization system especially renders it possible—depending upon the surface characteristics of the filler concerned—to provide, by suitable selection of the substituent X, an optimum adjustment of the reenforcing system and the vulcanization system with respect to each other which manifests itself in high tearing strengths, moduli or elasticities. An especial advantage of using the triazine compounds according to the invention is that the difficulties which usually occur in the vulcanization of mixtures containing light reenforcing fillers, especially active silicas, with conventional accelerators are overcome and that very good vulcanization properties also upon being subjected to dynamic stresses are achieved. The improvement attained in the use of the vulcanization system of the invention above all resides in the decrease of the number of the reaction steps up to the cross-linking, in the formation of polysulfidic cross-linking bridges or cross-linking bridges of equivalent behavior, even in the presence of finely divided silica or silicates and in a far-reaching similarity to the cross-linking structure which is obtained with an undisturbed vulcanization through which the modification reactions of the polymer, which are also desired, are caused.

The compounds included in the following are illustrative of the series of functional triazine compounds which are suitable for the vulcanization system according to the invention.

Such table identifies the substituents X, Y and Z, as well as the number $n$, in the compounds concerned which are of the following formula:

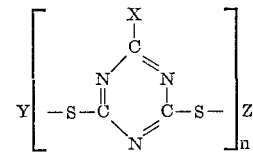

Those which have been ascribed a V number are referred to later in the application with reference to such number.

TABLE A

| Compound No. V | X | Y | Z | n |
|---|---|---|---|---|
| 6 | —SH | H | H | 1 |
| 19 | —N(CH$_2$CH$_2$OH)$_2$ | H | H | 1 |
| 20 | —NH—CH$_2$CH$_2$OH | H | H | 1 |
| 25 | —N(C$_2$H$_5$)$_2$ | H | H | 1 |
| 30 | —NH—CH$_2$CH$_2$CN | H | H | 1 |
| 31 | —N-diisobutyl | H | H | 1 |
| 32 | —NH-allyl | H | H | 1 |
| 41 | —NH—C$_6$H$_5$ | H | H | 1 |
| 42 | —O-n-butyl | H | H | 1 |
| 43 | —C$_6$H$_5$ | H | H | 1 |
| 44 | —glycino | H | H | 1 |
| 45 | —N(CH$_2$CH$_2$CN)$_2$ | H | H | 1 |
| 46 | —N-diallyl | H | H | 1 |
| 61 | —NH—SO$_2$—⬡—CH$_3$ | H | H | 1 |
|  | —NH—SO$_2$—CH$_3$ | H | H | 1 |
|  | —NH—⬡—SO$_3$H | H | H | 1 |
|  | —NH—⬡(COOH) | H | H | 1 |
|  | —NH—⬡—⬡—SO$_3$H | H | H | 1 |
|  | —NHNH—⬡ | H | H | 1 |
|  | —N⟨⬡S⬡⟩ | H | H | 1 |
|  | —N⟨⬡⬡⟩ | H | H | 1 |
|  | —NH—CH$_2$CH$_2$SO$_3$H | H | H | 1 |
| 60 | —NHC$_3$H$_7$-i | H | H | 1 |
| 47 | —N[CH(CH$_3$)CH$_2$OH]$_2$ | H | H | 1 |

TABLE A—Continued

| Compound No. V | X | Y | Z | n |
|---|---|---|---|---|
| 50 | —N(CH₃)(C₆H₅) | H | H | 1 |
| 51 | —N(C₆H₅)₂ | H | H | 1 |
| 59 | —NHCH₂C₆H₅ | H | H | 1 |
| 57 | —N(CH₂CH₂)₂O (morpholino) | H | H | 1 |
|  | —NH₂ | H | H | 1 |
|  | —OH | H | H | 1 |
|  | —OC₂H₅ | H | H | 1 |
|  | —SCH₃ | H | H | 1 |
| 58 | —NH—cyclohexyl | H | H | 1 |
| 4 | —N(C₂H₅)₂ | —S—CH₂C₆H₅ | —S—CH₂C₆H₅ | 1 |
| 7 | —NHC₂H₅ | —S—CH₂C₆H₅ | —S—CH₂C₆H₅ | 1 |
| 14 | —C₆H₅ | —S—CH₂C₆H₅ | —S—CH₂C₆H₅ | 1 |
| 15 | —N(CH₃)₂ | —S—CH₂C₆H₅ | —S—CH₂C₆H₅ | 1 |
| 16 | —N(C₂H₅)₂ | —S—C₄H₉-n | —S—C₄H₉-n | 1 |
| 17 | —OC₄H₉ | —S—CH₂C₆H₅ | —S—CH₂C₆H₅ | 1 |
| 24 | —N(C₂H₅)₂ | —NH·C₆H₁₁ | —NH·C₆H₁₁ | 1 |
| 26 | —C₆H₅ | —S—C₆H₅ | —S—C₆H₅ | 1 |
| 52 | —C₆H₅ | —S-2-benzothiazolyl | —S-2-benzothiazolyl | 1 |
| 53 | —N(C₂H₅)₂ | —S-2-benzothiazolyl | —S-2-benzothiazolyl | 1 |
| 74 | —N(C₂H₅)₂ | —S—morpholino | —S—morpholino | 1 |
| 86 | —NHC₄H₉ | —S—CH₂C₆H₅ | —S—CH₂C₆H₅ | 1 |
| 87 | —N(C₂H₅)(C₆H₁₁) (cyclohexyl) | —S—CH₂C₆H₅ | —S—CH₂C₆H₅ | 1 |
| 88 | —N(CH₃)(C₆H₁₁) | —S—CH₂C₆H₅ | —S—CH₂C₆H₅ | 1 |
| 89 | —N(C₆H₁₁)₂ | —S—CH₂C₆H₅ | —S—CH₂C₆H₅ | 1 |
| 21 | —N(CH₂CH₂OH)₂ | H | H | (1) |
| 22 | —NH—CH₂CH₂OH | H | H | (2) |
| 80 | —N(C₂H₅)₂ | H | H | (3) |

[1] Statistically ~4 (average mol wt. 1,010).
[2] Statistically ~2 (average mol wt. 400).
[3] Statistically ~8 (average mol wt. 1,705).

The mercapto triazine compounds are employed according to the invention in quantities between 0.3 and 6.0 and preferably between 0.5 and 4.0 parts by weight per 100 parts by weight of rubber. In general, good results are obtained in quantities which about correspond to those of the known vulcanization accelerators in conventional vulcanization systems.

The quantity of sulfur is analogously determined and the vulcanization system can contain up to 6 parts by weight of sulfur per 100 parts by weight of rubber. In general, however, about 0.5 to 3 parts by weight of sulfur are used.

As can be seen from the examples the ratio between both components of the vulcanization system, that is, between the triazine compound and the sulfur, can be selected as desired. Advantageously, however, higher quantitiese of the triazine compound are employed with lower quantities of sulfur or vice versa. In connection therewith it was found that, especially, with higher sulfur quantities, vulcanization assistants such as zinc oxide and stearic acid can be added to the mixture without disturbing the progress of the vulcanization to any noteworthy extent. It is also possible to employ conventional accelerators in combination with the vulcanization system according to the invention.

Various filled rubber vulcanizates were prepared in the following examples with representative compounds taken from Table A and compared with vulcanizates produced with conventional accelerators. The results of the investigations of the properties of the vulcanizates are given in Tables 1–10 which respectively are appendices to Examples 1–10.

In all instances mixtures were employed which contained 50 parts by weight of filler per 100 parts by weight of elastomer. The quantities of accelerator, S, St (stearic acid) and ZnO employed are given in parts by weight per 100 parts by weight of elastomer. The filler, type of elastomer, accelerator and vulcanization temperature are identified in the individual tables. The accelerators according to the invention are identified with reference to the V numbers given in Table A. The conventional accelerators Vulkazit CZ=N-cyclohexyl-2-benzothiazole sulfonamide
Vulkazit DM=2,2′-dibentothiazyl disulfide
Vulkazit D=diphenyl guanidine are identified by reference to the letters CZ, DM and D respectively. The carbon black employed was a furnace black of grade HAF. The silica employed was a highly active silica obtained by wet precipitation methods of a specific surface area of about 240 m.$^2$/g., having a primary particle size below 100$\mu$. The control tests with conventional accelerators are in each case identified in the tables by the appearance of "0" in the first column.

*Example 1*

The rubber used in this example was a mixture of a styrene-butadiene rubber with about 24% of styrene (designated as BH 150 in Table 1), furnace black (HAF), using trazine compound V25 and sulfur in the quantities indicated in Table 1. The vulcanization temperature was 160° C.

*Example 2*

The rubber used in this example was an oil extended butadiene styrene rubber designated as BH 302 in Table 2. Triazine compound V25 and sulfur were again used in this example.

*Example 3*

The series of tests which are the basis of this example and the tabulated results given in Table 3 were carried out in the same manner as the tests carried out in Examples 1 and 2. In this instance, however, 1,4-cis-polybutadiene was employed as the elastomer.

*Example 4*

In this example the triazine compound employed as the accelerator was compound V19. As can be seen from Table 4 it is also possible in this instance especially to cause substantial increase in the modulus values as comparable values for the tearing strength.

*Example 5*

In this and the following examples a highly active SiO$_2$ was employed in place of the carbon black of the previous examples. The triazine compound employed was compound V19. It will be seen by comparison of the tabulated results given in Table 5 that considerable increases in tearing strength and modulus values over those of the control which was vulcanized with Vulkazit DM and D, sulfur, zinc oxide and stearic acid were obtained.

*Example 6*

In this example the triazine compound employed again was compound V19. The rubber used was an oil extended butadiene-styrene rubber. The results are tabulated in Table 6.

*Example 7*

In this series of tests the triazine compound again was compound V19 but the rubber employed was 1,4-cis-polybutadiene. The results are tabulated in Table 7.

*Example 8*

The rubber employed in this series was the styrene-butadiene rubber designated as B 150. The triazine compound was compound V25. As can be seen from Table 8, even with low quantities of sulfur (128 parts) and of compound V25 (0.54 part), the modulus values are considerably higher than those of the control, whereas the tearing strengths are practically the same.

*Example 9*

Oil extended butadiene-styrene rubber designated as BH 302 and triazine compound V25 were used in this series. The results which are given in Table 9 indicate in this instance the improvement in mechanical properties was not confined to the modulus values and the tearing strength. The shore hardness was also raised slightly.

*Example 10*

In this series triazine compounds V6, V20, V30, V31, V32 and V41–V46 were employed in varying quantities with varying quantities of sulfur. The rubber employed was styrene-butadiene rubber BH 150 and the filler was SiO$_2$. While, as can be seen from Table 10, variations occurred in the mechanical properties of the vulcanizates depending upon the type of triazine compound employed in each instance the modulus values are above those of the control. Also the shore hardness varies within a technically interesting range.

TABLE 1 (EXAMPLE 1).—RUBBER=BH 150. VULCANIZATION TEMP. 160° C.

| Batch No. filler= carbon black | Accelerator | S | St | ZnO | Heating time, min. | Tearing strength, kg./cm.$^2$ | Modulus, Percent, kg./cm.$^2$ | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 1.25 CZ | 1.75 | 2.0 | 3.0 | 60 | 246 | 25 | 75 | 410 | 30 | 68 | 155 | |
| 1 | 0.54 V25 | 3.84 | | | 20 | 218 | 38 | 106 | 340 | 32 | 67 | 197 | |
| 2 | 0.54 V25 | 2.56 | | | 40 | 170 | 39 | 107 | 290 | 34 | 67 | | |
| 3 | 0.54 V25 | 1.28 | | | 80 | 242 | 30 | 77 | 420 | 34 | 65 | 145 | |
| 4 | 1.08 V25 | 3.84 | | | 40 | 226 | 66 | 189 | 230 | 32 | 74 | | |
| 5 | 1.08 V25 | 2.56 | | | 20 | 215 | 39 | 110 | 300 | 34 | 69 | 215 | |
| 6 | 1.08 V25 | 1.28 | | | 60 | 271 | 34 | 95 | 405 | 36 | 68 | 193 | |
| 7 | 2.16 V25 | 3.84 | | | 20 | 250 | 70 | 198 | 240 | 35 | 73 | | |
| 8 | 2.16 V25 | 2.56 | | | 20 | 238 | 71 | 147 | 283 | 35 | 73 | | |
| 9 | 2.16 V25 | 1.28 | | | 40 | 262 | 55 | 113 | 353 | 36 | 69 | 226 | |
| 10 | 3.24 V25 | 3.84 | | | 20 | 202 | 101 | | 185 | 34 | 75 | | |
| 11 | 3.24 V25 | 2.56 | | | 20 | 225 | 57 | 116 | 280 | 36 | 73 | | |
| 12 | 3.24 V25 | 1.28 | | | 40 | 210 | 42 | 112 | 300 | 37 | 69 | 210 | |

TABLE 2 (EXAMPLE 2).—OIL EXTENDED BUTADIENE-STYRENE-RUBBER BH 302. VULCANIZATION TEMP. 160° C.

| Batch No. filler= carbon black | Accelerator | S | St | ZnO | Heating time, min. | Tearing strength, kg./cm.$^2$ | Modulus, Percent, kg./cm.$^2$ | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 1.25 CZ | 1.75 | 2.0 | 3.0 | 60 | 202 | 15 | 53 | 473 | 21 | 61 | 105 | |
| 1 | 1.08 V25 | 2.56 | | | 20 | 199 | 24 | 77 | 378 | 26 | 58 | 150 | |
| 2 | 2.16 V25 | 1.28 | | | 40 | 206 | 22 | 75 | 400 | 27 | 63 | 145 | |

TABLE 3 (EXAMPLE 3).—POLYBUTADIENE RUBBER CB. VULCANIZATION TEMP. 160° C.

| Batch No. filler= carbon black | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 0.7 CZ | 1.75 | 2.0 | 3.0 | 40 | 126 | 17 | 40 | 388 | 36 | 61 | 80 | |
| 1 | 2.16 V25 | 2.56 | | | 20 | 127 | 25 | 57 | 323 | 36 | 65 | 114 | |
| 2 | 2.16 V25 | 1.28 | | | 60 | 146 | 25 | 62 | 343 | 41 | 65 | 118 | |

TABLE 4 (EXAMPLE 4).—RUBBER BH 150. VULCANIZATION TEMP. 160° C.

| Batch No. filler= carbon black | Accelerator | S | St | ZnO | Heating time, min. | Tearing strength, kg./cm.² | Modulus percent, kg./cm.² | Percent | Elongation on break, percent | Elasticity, percent | Shore hardness | Impact resistance, kg./cm. | Modulus | |
|---|---|---|---|---|---|---|---|---|---|---|---|---|---|---|
| | | | | | | | | | | | | | 300% | 500% |
| 0 | 1.25 CZ | 1.75 | 2.0 | 3.0 | 60 | 246 | 25 | 75 | 410 | 30 | 68 | | 155 | |
| 1 | 1.24 V19 | 2.56 | | | 60 | 197 | 37 | 106 | 307 | 37 | 68 | 12.5 | 193 | |
| 2 | 1.24 V19 | 1.28 | | | 80 | 219 | 33 | 84 | 415 | 38 | 63 | 12.5 | 153 | |
| 3 | 3.72 V19 | 2.56 | | | 40 | 211 | 41 | 127 | 305 | 39 | 72 | 11.0 | 209 | |

TABLE 5 (EXAMPLE 5).—BUTADIENE-STYRENE-RUBBER BH 150. VULCANIZATION TEMP. 160° C.

| Batch No. filler= SiO₂ | Accelerator | S | St | ZnO | Heating time, min. | Tearing strength, kg./cm.² | Modulus percent, kg./cm.² | Percent | Elongation on break, percent | Elasticity, percent | Shore hardness | Impact resistance, kg./cm. | Modulus | |
|---|---|---|---|---|---|---|---|---|---|---|---|---|---|---|
| | | | | | | | | | | | | | 300% | 500% |
| 0 | 1.6 D / 2.4 DM | 1.75 | 2.0 | 3.0 | 60 | 157 | 23 | 44 | 532 | | | | 67 | 138 |
| 1 | 0.62 V19 | 3.84 | | | 60 | 158 | 48 | 91 | 357 | 40 | 81 | 15.3 | 140 | |
| 2 | 0.62 V19 | 2.56 | | | 60 | 161 | 33 | 67 | 500 | 39 | 79 | 25.3 | 102 | 162 |
| 3 | 0.62 V19 | 1.28 | | | 60 | 150 | 39 | 48 | 650 | 38 | 77 | 32.8 | 65 | 112 |
| 4 | 1.24 V19 | 3.84 | | | 40 | 139 | 54 | 104 | 275 | 38 | 82 | | | |
| 5 | 1.24 V19 | 2.56 | | | 60 | 174 | 54 | 93 | 363 | 38 | 79 | 16.7 | 144 | |
| 6 | 1.24 V19 | 1.28 | | | 60 | 240 | 41 | 68 | 570 | 40 | 79 | 29.7 | 91 | 205 |
| 7 | 2.48 V19 | 3.84 | | | 20 | 183 | 66 | 146 | 253 | 36 | 81 | | | |
| 8 | 2.48 V19 | 2.56 | | | 40 | 199 | 57 | 119 | 333 | 39 | 81 | | 174 | |
| 9 | 2.48 V19 | 1.28 | | | 60 | 225 | 52 | 91 | 500 | 42 | 82 | 22.4 | 137 | |
| 10 | 3.72 V19 | 3.84 | | | 20 | 212 | 94 | 193 | 237 | 40 | 85 | | | |
| 11 | 3.72 V19 | 2.56 | | | 20 | 222 | 59 | 124 | 345 | 40 | 81 | | 192 | |
| 12 | 3.72 V19 | 1.28 | | | 40 | 227 | 49 | 95 | 460 | 44 | 83 | | 142 | |

TABLE 6 (EXAMPLE 6).—OIL EXTENDED BUTADIENE-STYRENE-RUBBER BH 302. VULCANIZATION TEMP. 160° C.

| Batch No. filler₂= SiO₂ | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 2.4 DM / 1.6 D | 1.75 | 2.0 | 3.0 | 60 | 146 | 18 | 35 | 592 | 26 | 66 | 53 | 106 |
| 1 | 1.24 V19 | 3.84 | | | 40 | 138 | 45 | 58 | 327 | 35 | 77 | 130 | |
| 2 | 1.24 V19 | 1.28 | | | 80 | 139 | 31 | 56 | 537 | 34 | 76 | 83 | 129 |
| 3 | 2.48 V19 | 1.28 | | | 60 | 164 | 32 | 64 | 483 | 33 | 75 | 100 | |
| 4 | 3.72 V19 | 1.28 | | | 80 | 192 | 46 | 87 | 440 | 32 | 79 | 130 | |

TABLE 7 (EXAMPLE 7).—POLYBUTADIENE RUBBER CB. VULCANIZATION TEMP. 160° C.

| Batch No. filler= SiO₂ | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 1.6 D / 2.4 DM | 1.75 | 2.0 | 3.0 | 60 | 117 | 35 | 64 | 420 | 46 | 72 | 82 | |
| 1 | 2.48 V19 | 3.84 | | | 40 | 161 | 48 | 92 | 313 | 45 | 75 | 130 | |
| 2 | 2.48 V19 | 2.56 | | | 60 | 151 | 45 | 83 | 330 | 49 | 75 | 119 | |

TABLE 8 (EXAMPLE 8).—BUTADIENE-STYRENE-RUBBER BH 150. VULCANIZATION TEMP. 160° C.

| Batch No. filler= SiO₂ | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | 1.6 D / 2.4 DM | 1.75 | 2.0 | 3.0 | 60 | 157 | 23 | 44 | 532 | | | 67 | 138 |
| 1 | 0.54 V25 | 3.84 | | | 60 | 162 | 53 | 104 | 290 | 42 | 84 | | |
| 2 | 0.54 V25 | 1.28 | | | 60 | 156 | 35 | 65 | 508 | 40 | 79 | 93 | 151 |
| 3 | 2.16 V25 | 2.56 | | | 40 | 175 | 66 | 118 | 307 | 38 | 81 | 170 | |
| 4 | 3.24 V25 | 1.28 | | | 40 | 212 | 46 | 85 | 470 | 38 | 78 | 105 | |

TABLE 9 (EXAMPLE 9).—OIL EXTENDED BUTADIENE-STYRENE-RUBBER BH 302. VULCANIZATION TEMP. 160° C.

| Batch No. filler = SiO₂ | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | {1.6 D, 2.4 DM} | 1.75 | 2.0 | 3.0 | 40 | 157 | 27 | 40 | 595 | 30 | 71 | 63 | 121 |
| 1 | 0.54 V25 | 1.28 | | | 60 | 153 | 30 | 55 | 568 | 37 | 72 | 79 | 133 |
| 2 | 1.08 V25 | 1.28 | | | 40 | 166 | 37 | 66 | 533 | 39 | 79 | 93 | 157 |
| 3 | 2.16 V25 | 1.28 | | | 20 | 191 | 31 | 61 | 685 | 37 | 79 | 84 | 151 |
| 4 | 3.24 V25 | 1.28 | | | 40 | 168 | 39 | 70 | 465 | 37 | 77 | 103 | |

TABLE 10 (EXAMPLE 10).—BUTADIENE-STYRENE-RUBBER BH 150. VULCANIZATION TEMP. 160° C.

| Batch No. filler = SiO₂ | Accelerator | S | St | ZnO | Heating time, min. | Tearing strength, kg./cm.² | Modulus, Percent, kg./cm.² | Percent | Elongation on break, Percent | Elasticity, Percent | Shore hardness | Modulus | |
|---|---|---|---|---|---|---|---|---|---|---|---|---|---|
| | | | | | | | | | | | | 300% | 500% |
| 0 | {1.6 D, 2.4 DM} | 1.75 | 2.0 | 3.0 | 60 | 157 | 23 | 44 | 532 | | | 67 | 138 |
| 1 | 0.44 V6 | 2.84 | | | 80 | 241 | 33 | 59 | 660 | 43 | 78 | 94 | 184 |
| 2 | 2.64 V6 | 1.28 | | | 100 | 232 | 26 | 45 | 722 | 43 | 78 | 70 | 125 |
| 3 | 0.51 V20 | 3.84 | | | 60 | 194 | 39 | 77 | 448 | 43 | 80 | 127 | |
| 4 | 3.06 V20 | 1.28 | | | 80 | 278 | 35 | 61 | 725 | 43 | 80 | 93 | 167 |
| 5 | 0.56 V30 | 3.84 | | | 60 | 174 | 44 | 84 | 403 | 43 | 82 | 132 | |
| 6 | 3.18 V30 | 1.28 | | | 80 | 267 | 36 | 64 | 653 | 45 | 83 | 90 | 162 |
| 7 | 0.68 V31 | 3.84 | | | 40 | 255 | 54 | 101 | 378 | 44 | 83 | 159 | |
| 8 | 4.08 V31 | 1.28 | | | 40 | 239 | 48 | 90 | 470 | 46 | 82 | 130 | |
| 9 | 0.50 V32 | 3.84 | | | 40 | 226 | 41 | 81 | 465 | 42 | 83 | 126 | |
| 10 | 2.00 V32 | 1.28 | | | 80 | 286 | 46 | 74 | 658 | 43 | 84 | 104 | 191 |
| 11 | 0.59 V41 | 3.84 | | | 40 | 212 | 47 | 86 | 470 | 35 | 83 | 135 | |
| 12 | 3.53 V41 | 1.28 | | | 60 | 232 | 36 | 57 | 685 | 37 | 78 | 84 | 144 |
| 13 | 0.54 V42 | 3.84 | | | 40 | 222 | 30 | 54 | 640 | 36 | 75 | 88 | 151 |
| 14 | 3.24 V42 | 1.28 | | | 80 | 241 | 26 | 39 | 767 | 37 | 74 | 61 | 103 |
| 15 | 0.55 V43 | 3.84 | | | 40 | 132 | 28 | 60 | 400 | 36 | 78 | 96 | |
| 16 | 3.30 V43 | 1.28 | | | 40 | 186 | 34 | 56 | 567 | 40 | 79 | 88 | 160 |
| 17 | 0.55 V44 | 3.84 | | | 40 | 204 | 32 | 56 | 580 | 38 | 79 | 87 | 158 |
| 18 | 3.30 V44 | 1.28 | | | 40 | 192 | 26 | 43 | 705 | 40 | 77 | 65 | 108 |
| 19 | 0.67 V45 | 3.84 | | | 80 | 212 | 44 | 89 | 430 | 40 | 82 | 128 | |
| 20 | 4.02 V45 | 1.28 | | | 60 | 256 | 34 | 56 | 730 | 41 | 80 | 82 | 134 |
| 21 | 0.60 V46 | 3.84 | | | 20 | 163 | 44 | 86 | 375 | 42 | 79 | 137 | |
| 22 | 3.60 V46 | 1.28 | | | 60 | 224 | 50 | 89 | 500 | 44 | 84 | 133 | |

*Example 11*

A series of vulcanizates were produced using styrene-butadiene rubber BH 150 containing 50 parts SiO₂ as filler, 1.28 parts by weight of sulfur per 100 parts by weight of the rubber and varying quantities of triazine compound V19 and the abrasion resistance thereof tested in comparison with SiO₂ filled vulcanizates obtained with conventional accelerators, and with HAF furnace black filled vulcanizates both with and without softener addition (Naftolen, a commercially available softener composed of a mixture of high molecular weight unsaturated hydrocarbons).

Vulcanized test plates dimensioned 120 x 20 mm. were prepared from each mixture and tested on an abrading apparatus of the type of the Dunlop-Lambourne abrader at a surface velocity of about 80 km./h. The abrasion loss was ascertained by weighing the test plates after 180,000 revolutions. The abrasion loss suffered by the conventional HAF furnace black filled vulcanizate produced with a conventional accelerator but without the softener was set at 100% in the comparison made.

In the accompanying drawing:

FIG. 1 graphically shows the results of the abrasion tests; and

FIG. 2 graphically shows the typical course of the torque measured in an elastometer test during vulcanization.

As can be seen from FIG. 1 the abrasion loss suffered by the HAF black containing vulcanizate which also contained the softener was about 200% as compared with the 100% of the vulcanizate in which the softener had been omitted and that the SiO₂ filled rubber composition produced with the conventional accelerator was between 470 to 500%. The curve obtained when using varying quantities of compound V19 as accelerator showed that considerably less abrasion loss was suffered in all instances than with the conventionally vulcanized SiO₂ filled rubber and that with quantities of compound V19 above about two parts per 100 parts of the rubber the abrasion loss was even less than that suffered by the conventionally vulcanized furnace black filled rubber.

The effectiveness of the new vulcanizing agent system according to the invention was also shown by oscillating elastometer measurements. In such tests a cylindrical chamber of a diameter of 50 mm. and a height of 1 mm. provided with a double cone shaped rotor was filled with the mixture tested and such rotor turned ±1.5° three times per minute. The torque required for turning the rotor was measured and recorded while the mixture was vulcanized at a constant temperature. The typical course of the torque D required during the vulcanization time $t$ is shown schematically in FIG. 2 of the drawing.

The torque difference $D_x - D_{\eta 0}$ depends upon the number of cross-linking locations introduced so that it is an indication of the effectiveness of a vulcanizing agent system in comparison with others when the remaining component of the mixtures are the same.

A series of such tests were carried out with conventional accelerators DM, CZ and M (mercaptobenzothiazol) and a large number of the triazine compound accelerators according to the invention. The results of such tests are given in Table 11. The triazine compounds concerned which were already included in Table A are identified by the V numbers ascribed in such table. Those not previously described in Table A bear an "X" number and these are described at the end of the table. In each instance the same butadiene-styrene rubber was used. The quantity of filler employed was 50 parts by weight per 100 parts by weight of the rubber. The quantity of triazine compound used was 5 mmol and the quantity of sulfur 7.2 mmol. The vulcanization temperature used during the tests was 160° C.

The first column of Table 11 gives the torque values in $(D_x - D_{\eta 0}) \cdot 10^3$ [mkp.] obtained with HAF filled rubber modified with ZnO+stearic acid, the second column gives such values obtained with non-modified HAF filled rubber and column 3 gives such values obtained with active SiO$_2$ filled rubber. The SiO$_2$ employed was one having a BET specific surface area of 120 m.$^2$/g.

TABLE 11

| Accelerator | $(D_\infty - D_{\eta_0})10^3$ [mkp.] HAF, ZnO+stearic acid | HAF | Active SiO$_2$ |
|---|---|---|---|
| DM | 524 | 496 | 488 |
| M | 475 | 457 | 460 |
| CZ | 531 | 444 | 453 |
| 72 X | 546 | 640 | 605 |
| V46 | 491 | 635 | 626 |
| 84 X | 560 | 628 | 596 |
| 96 X | 526 | 625 | 594 |
| V32 | | 621 | 597 |
| V50 | 576 | 620 | 617 |
| V57 | | 615 | 596 |
| V58 | 531 | 615 | 545 |
| V59 | 542 | 605 | 559 |
| V60 | | 603 | 552 |
| 83 X | 480 | 598 | 536 |
| V41 | 492 | 595 | 548 |
| V51 | 559 | 593 | 621 |
| 85 X | 558 | 592 | 565 |
| V43 | | 588 | 566 |
| V25 | 460 | 587 | 636 |
| 62 X | 552 | 584 | 528 |
| 82 X | 593 | 568 | 549 |
| 95 X | 524 | 567 | 535 |
| V31 | 596 | 566 | 614 |
| V44 | | 559 | |
| V61 | | 550 | |
| V30 | | 524 | 561 |
| V19 | | 523 | 548 |
| V45 | | 521 | 541 |
| V20 | | 520 | 528 |
| V47 | | 517 | 546 |
| 81 X | 521 | 515 | 499 |
| 48 X | | 512 | 485 |
| V53 | 709 | 647 | 547 |
| V52 | 612 | 613 | 460 |
| V16 | 575 | 592 | |
| V4 | 532 | 576 | |
| V15 | 480 | 546 | 479 |
| V86 | 577 | 541 | |
| V7 | 511 | 527 | |
| V17 | 359 | 503 | |
| V89 | 508 | 500 | 490 |
| V74 | 484 | 498 | |
| V88 | 540 | 497 | |
| V14 | 456 | 495 | |
| V87 | 504 | 443 | |
| V80 | 581 | 655 | 549 |
| V22 | | 517 | |
| V21 | 464 | 491 | 470 |
| V24 | 596 | 535 | |

72 X=2-dimethylamino-4,6-dimercapto-s-triazine
84 X=2-N-methyl-cyclohexylamino-4,6-dimercapto-s-triazine
96 X=2-hexamethylenimino-4,6-dimercapto-s-triazine
83 X=2(2-ethyl-1-hexylamino)4,6-dimercapto-s-triazine
85 X=2-dicyclohexylamino-4,6-dimercapto-s-triazine
62 X=2-cyclohexyl-i-propanolamino-4,6-dimercapto-triazine
82 X=2-t-butylamino-4,6-dimercapto-triazine
95 X=2-oleylamino-4,6-dimercapto-s-triazine
81 X=2-stearylamino-4,6-dimercapto-s-triazine
48 X=N,N'-bis(2,4-dimercapto-triazine-6yl)-hexamethylendiamine.

We claim:
1. In a process for vulcanizing a vulcanizable material selected from the group consisting of rubber and rubber-like elastomers which still contain ethylenic double bonds in admixture with a reenforcing filler, the step of employing a vulcanization system of (1) an effective amount of sulfur and (2) as an accelerator an effective amount of a mercapto triazine compound of the formula

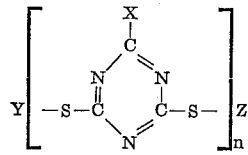

wherein $n$ is an average number from 1 to about 20, X is selected from the group consisting of (1) alkyl, aryl and aralkyl connected directly to the triazine ring, (2) hydrogen, alkyl, alkenyl, aryl and aralkyl connected to the triazine ring over a heteroatom selected from the group consisting of —S— and —O—, (3) hydrogen, alkyl, alkenyl, aryl and aralkyl connected to the triazine ring over a hetero-atom group selected from the group consisting of —NH—, —NHSO$_2$—, —NH—NH— and NR$^6$ wherein R$^6$ is selected from the group consisting of alkyl, alkenyl and aryl and (4) and such radicals under (1), (2) and (3) in which the radical thereof selected from the group consisting of alkyl, aryl and aralkyl is substituted by a substituent selected from the group consisting of —OH, —CN, —SO$_3$H and —COOH, each of Y and Z individually is selected from the group consisting of (a) hydrogen (b) —S—R wherein R is selected from the group consisting of alkyl, aryl, aralkyl 2-benzothiazolyl and morpholino, (c) 

wherein each of R$^1$ and R$^2$ is individually selected from the group consisting of alkyl, aryl and aralkyl, (d) 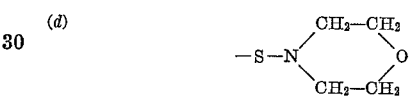

2. The process of claim 1 in which the quantity of the triazine compound employed is between 0.3 and 6 parts by weight and the quantity of sulfur is an effective amount up to 6 parts by weight per 100 parts by weight of the vulcanizable material.

3. The process of claim 1 in which the quantity of the triazine compound employed is between 0.5 and 4.0 parts by weight and the quantity of sulfur is 0.5 to 3 parts by weight per 100 parts by weight of the vulcanizable material.

4. The process of claim 1 in which the reinforcing filler is a finely divided active reinforcing silica.

5. The process of claim 1 in which said mercapto triazine compound is of the formula

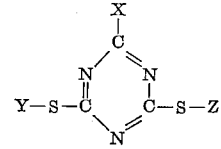

wherein X, Y and Z have the same meaning as in claim 1.

6. The process of claim 1 in which said mercapto triazine compound is of the formula

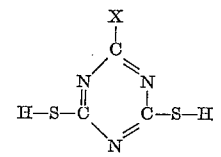

wherein X has the same meaning as in claim 1.

7. The process of claim 1 in which said mercapto triazine compound is of the formula

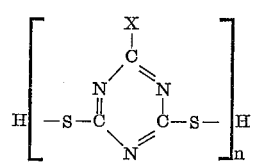

wherein $n$ is an average number from 1 to 10 wherein X has the same meaning as in claim 1.

References Cited

UNITED STATES PATENTS

| 2,914,503 | 9/1959 | Pechukas | 260—41.5 |
| 3,156,689 | 9/1964 | Dexter et al. | 260—248 |
| 3,156,690 | 9/1964 | Dexter et al. | 260—249.5 |
| 3,245,992 | 4/1966 | Dexter et al. | 260—248 |
| 3,257,354 | 6/1966 | Dexter et al. | 260—45.8 |

MORRIS LIEBMAN, *Primary Examiner.*

H. S. KAPLAN, *Assistant Examiner.*